United States Patent Office 3,513,652
Patented May 26, 1970

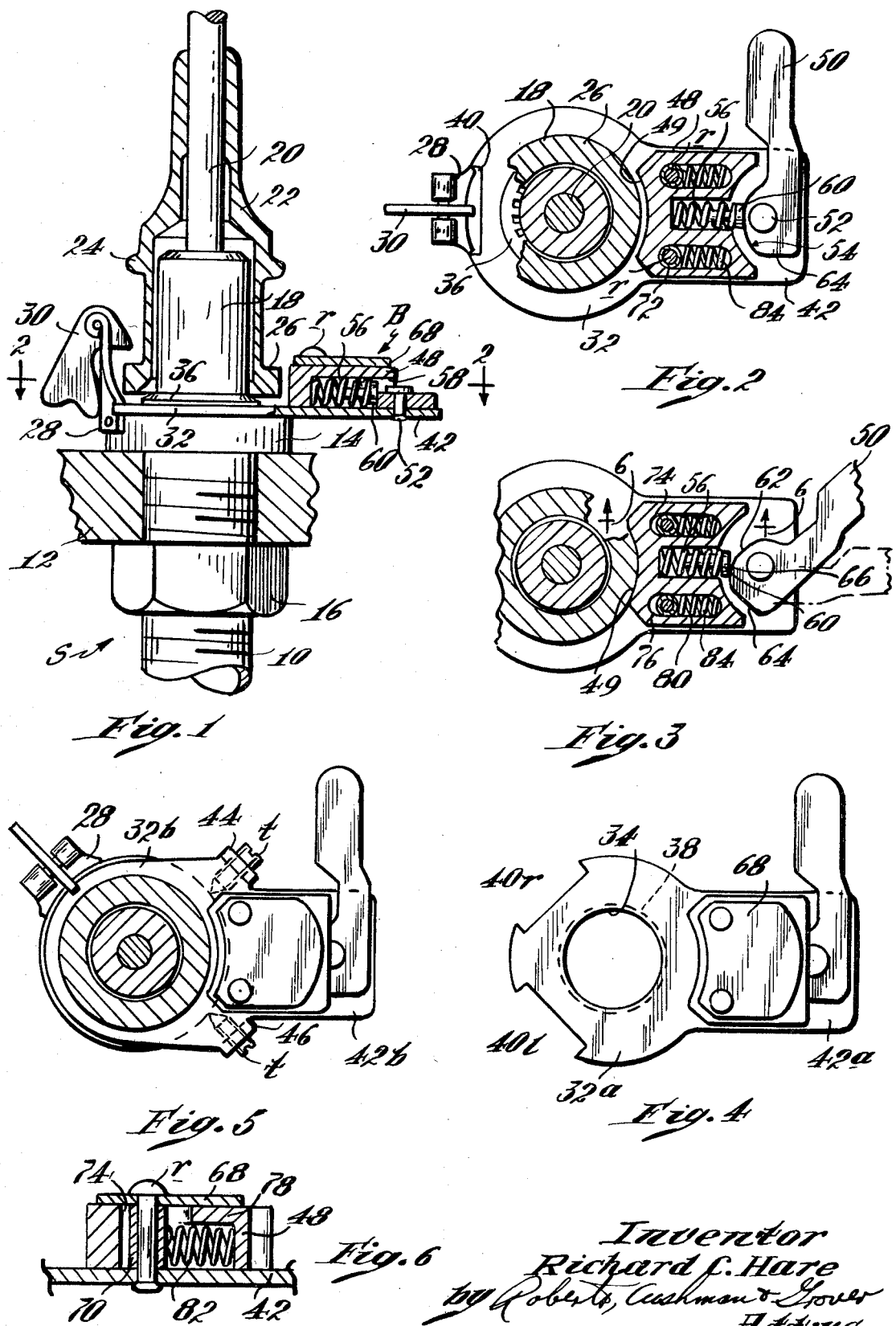

3,513,652
SPINDLE BRAKES
Richard C. Hare, Whitinsville, Mass., assignor to The George F. Clentimack Co., Inc., North Attleboro, Mass., a corporation of Massachusetts
Filed Oct. 21, 1968, Ser. No. 769,223
Int. Cl. D01h 7/22
U.S. Cl. 57—88                                  22 Claims

ABSTRACT OF THE DISCLOSURE

A brake mechanism for use on textile spindles of the type having a spindle base whose construction includes a mounting flange and a neck extending therefrom to receive the spindle blade. The brake mechanism comprises a mounting plate fitting over the neck and against the mounting flange, being secured there by means preventing relative up and down and rotary motion. A brake pad is slidably secured to the mounting plate, being moved between braking and resting positions by a camming lever operating through a spring linkage. The spring linkage comprises opposed driving and return springs acting on the brake pad with different spring constants to provide a return force on the brake pad, a holding force on the camming lever, and an override in the linkage to compensate for brake pad wear.

Background of the invention

The field of the present invention relates to brake mechanisms for manually arresting the rotation of textile spindles as found on spinning or twisting frames.

During the operation of spinning frames the repair of broken ends and other operations call for stopping the rotation of a spindle. The customary practice of "hand grabbing" spindles to stop them has met with an increasing risk of burns as spindle speeds have mounted. To eliminate this danger a large variety of manual brakes have been devised, as shown by U.S. Pats. 3,226,923 (1966); 3,137,118 (1964); 3,122,875 (1964); 3,063,230 (1962); 3,044,248 (1962); 3,019,589 (1962); 2,966,025 (1960); 2,770,092 (1956); 2,657,523 (1953); 1,882,144 (1932); and 1,539,442 (1925).

Unfortunately, many of these prior brakes require parts to be formed integrally with the spindle base, or require the spindle base to be drilled, grooved, or slotted for mounting brakes. For the millions of spindles now in use having no provision for mounting a brake, these prior brake designs pose terrific changeover problems, involving at the least the removal and machining of the spindle base and at the most the replacement with completely new spindle bases.

Other prior brakes are handicapped by their compatibility only with certain kinds of spindles. As examples, some brakes are attached around the base mounting flange—however, the diameter of this flange varies with the manufacturer. Some brakes are attached between this flange and the spindle rail, or to the spindle rail itself—however, the thickness of the flange and the height of the whorl above the rail vary to create problems with brake pad positioning. Some brakes attach at a fixed angle to the doffer post and latch—however, some mills prefer to position adjacent bases with doffer posts angled toward each other at about 45°, without a corresponding change in brake position. The incompatibility of the foregoing brakes with many spindles often means that a mill buying spindles without brakes, later preferring a brake of a type different from that furnished by the original spindle manufacturer, is compelled to take the same make.

In addition to the foregoing problems, prior brakes have generally been complicated and expensive, insufficiently free of interference with spindle driving tapes, and lacking in durability and reliability.

Summary of the invention

Objects of the present invention are to provide a spindle brake suitable for use on a large variety of spindles with no more than minor variations, which does not require modification of the spindle for installation, which is compact, simple and positive in operation, easy and inexpensive to construct, and durable and reliable in use.

According to the invention, the brake mechanism comprises, for use on textile spindles of the type whose construction includes a mounting flange and a neck extending therefrom to receive the spindle blade, mounting means including a mounting plate having an opening to receive said neck, and securing means for holding said plate against said flange and against rotation. A brake pad is slidably fastened to said mounting means and is moved into and out of braking engagement with said spindle by cam means operating through spring means. The spring means provide opposing spring forces designed to return the brake pad to rest position, to hold the cam lever in its rest position, and to permit overtravel of said cam lever to compensate for brake pad wear. Other and further novel features and advantages will be apparent from the following description of specific embodiments.

Description of the drawings

FIG. 1 is an axial section of a textile spindle mounting a brake mechanism according to the invention;

FIG. 2 is a section on line 2—2 of FIG. 1 with the brake mechanism in rest or retracted position;

FIG. 3 is a section similar to FIG. 2 with the brake mechanism moved to braking position;

FIGS. 4 and 5 are sections similar to FIG. 2 illustrating different embodiments of mounting means according to the invention; and FIG. 6 is a section on line 6—6 of FIG. 3.

Description of the preferred embodiments

FIG. 1 illustrates a conventional textile spindle assembly S having a base 10 secured to the spindle rail 12 of a spinning or twisting machine. The base 10 comprises a mounting flange 14 and a nut 16 for attachment to the rail 12, and a cylindrical neck 18 extending upwardly from flange 14 to receiver the rotating spindle blade 20, which has its lower end journalled in bearings (not shown) within base 10. Fastened to blade 20 and extending over neck 18 is a whorl 22 which is provided with an upper flange 24 and a lower flange 26 to guide a drive tape (not shown) placed therebetween. A doffer post 28 and latch 30 are attached to the edge of mounting flange 14.

The brake mechanism B according to the invention comprises a mounting plate 32 having a circular opening 34 of size to closely receive neck 18 therein and to thereby accurately locate the brake B with relation to the spindle S. Mounting plate 32 rests against the upper surface of flange 14 and is secured there against up-and-down movement by means of a one-way gripper washer 36 engaging with the neck 18. To provide space for fillets at the juncture of flange 14 and neck 18, a chamfer 38 may be provided at opening 34 (FIG. 5). To secure the mounting plate 32 against rotation, it is provided with a peripheral notch 40 which engages doffer post 28. Opposite notch 40, mounting plate 32 has a coplanar extension 42 forming a platform to which the movable brake parts are attached.

The foregoing mounting means is predicated on the discovery that the one spindle part most uniformly standard among manufacturers is the base neck 18, and that between the whorl lower flange and base mounting flange 14 there is sufficient space to fit a plate of, e.g., ³⁄₃₂″ thickness, which furnishes adequate strength to serve as a mounting platform for a brake. The advantages of plate 2 as a mounting means should be apparent: First, it is preferably a stamping from standard sheet material, and therefore inexpensively made and easily modified where necessary to adapt to different spindles. Second, it is easily installed merely by sliding it over neck 18, and by thereafter applying gripper washer 36. No modification or removal of existing spindle bases is required for installation of the brake, and down time of a mill converting to these brakes is minimized, as is the cost of conversion. Third, plate 32 is very close to the rotating whorl 22, so that the active braking parts thereon need not have the strength to span longer distances, while at the same time, plate 32 is clear of interference with the tape driving the whorl 22.

As noted above, mounting plate 32 can be easily modified to adapt to special uses. FIGS. 4 and 5 show two such modifications. Mounting plate 32a illustrated in FIG. 4 has two notches 40l and 40r offset by approximately 45° from the axis of extension 42a, thereby to permit engagement with spindles mounted with doffer latch posts 28 offset either to the right or left by this angle. Mounting plate 32b illustrated in FIG. 5 has, on either side of extension 42b, turned down ears or tabs 44 and 46 mounting set screws t which bear against the edge of mounting flange 14. Mounting plate 32b clears doffer latch post 28, and therefore may be mounted at any angle thereto. When set screws t are used to secure plate 32b in place, gripper washer 36 may be omitted if desired.

Referring again to FIGS. 1, 2 and 3, mounting plate extension 42 has a brake pad 48 secured thereto for sliding motion to bring arcuate portion 49 of the pad to and away from contact with whorl lower flange 26 (FIGS. 2 and 3). Brake pad 48 is moved by means of lever 50 pivoted at pin 52 and having a camming surface 54. The travel of camming surface 54 is transmitted to pad 48 through drive spring 56 located in pad recess 58 and carrying a headed pin 60 acting as a cam follower. Camming surface 54 has a flat 62 serving to detent the lever 50 in its rest or unbraked position, a flat 64 serving to detent the lever 50 in its braked position, and a curved portion 66 between said flats for translating the pad 48 between its braked and unbraked position. As shown in FIG. 3, drive spring 56 and camming surface 54 are so positioned that pad 48 will first contact whorl flange 26 as lever 50 is moved through an intermediate position solid lines), and so that spring 56 will be compressed as lever 50 is moved beyond this intermediate position to its fully braked position (dashed lines) with flat 64 against pin 60. This provision for cam overtravel locks lever 50 in its braking position and permits the brake pad to make effective contact even after it is worn, and extends the useful life of the brake.

As shown in FIGS. 2, 3 and 6, brake pad 48 is secured for sliding motion relative to plate 32 by means of a cover or guide 68 held clear of pad 48 by stand-off bushings 70, 72 and secured to mounting plate extension 42 with rivets r extending through the bushings. Alternatively, shoulder rivets can be used. The bushings 70, 72 fit in through slots 74, 76 provided in brake pad 48. There is sufficient play of bushings 70, 72 in the slots 74, 76 to permit self-alignment of the brake pad arcuate portion 49 in making contact with the whorl flange 26 for even braking. Extending from the through slots 74, 76 on the underneath of pad 48 are recesses 78, 80 which accommodate parallel return springs 82, 84 (FIG. 6), equally spaced from drive spring 56.

The return springs 82, 84 exert a force between pad 48 and bushings 70, 72 which is in opposition to the force exerted on pad 48 by drive spring 56. Return springs 82, 84 are of equal spring constant but together have a lower spring constant than drive spring 56 so that they compress more than the drive spring when cam lever 50 is actuated. When the cam lever 50 is released, however, return springs 82, 84 resume their prior position. Accordingly, return springs 82, 84 serve to pull brake pad 48 well away from dragging contact with whorl flange 26 when the brake is released, and further serve to exert a firm holding force through drive spring 56 on lever 50 when the brake is to be retracted and not in use.

The construction of the foregoing brake parts is very easy. Cam lever 50 and cover 68 are preferably stamped from stock sheet material. Brake pad 48 is preferably molded from conventional braking materials such as hard rubber. The springs 56, 82 and 84, bushings 70, 72, rivets r and pin 52 are all standard items. Accordingly, the brake can be easily and inexpensively made.

It should be understood that the present disclosure is for the purpose of illustration only and that this invention includes all modifications and equivalents which fall within the scope of the appended claims.

I claim:

1. A braking mechanism for a spindle of the type having a base whose construction includes a mounting flange for securing the base to a rail and a neck extending upwardly from the mounting flange to receive the spindle blade, and a whorl attached to the blade and having a lower flange adjacent the base mounting flange, comprising:
    mounting means including a mounting plate having an opening to receive said neck, said mounting plate being positioned between said whorl lower flange and said base mounting flange with said neck in said opening;
    securing means for holding said plate against said mounting flange and against rotation;
    brake pad means supported by said mounting means; and
    means for moving said brake pad means into contact with said spindle.

2. Braking mechanism according to claim 1 wherein said spindle includes a doffer latch post attached to said mounting flange, and wherein said securing means comprises a notch in said mounting plate adapted to engage said post, thereby to prevent rotation.

3. Braking mechanism according to claim 2 wherein said securing means comprises a plurality of notches adapted to alternatively engage said post, whereby said brake may be attached to said spindle in a plurality of positions relative to said post.

4. Braking mechanism according to claim 1 wherein said spindle includes a doffer latch post attached to said mounting flange, said mounting plate is not prevented from rotating by said post, and said securing means comprises tab means extending from said mounting plate and means on said tab means for engaging said mounting flange.

5. Braking mechanism according to claim 1 wherein said securing means comprises a one-way fastener fitting over said neck and against said mounting plate.

6. Braking mechanism according to claim 1 wherein said mounting plate encircles said neck and has a coplanar extension for mounting said brake pad means.

7. Braking mechanism according to claim 1 wherein said mounting plate opening closely receives said neck, thereby to accurately locate said brake pad with relation to the moving spindle parts to be braked.

8. Braking mechanism according to claim 1 wherein said spindle includes a whorl adjacent said mounting plate, and wherein said brake pad is slidably connected to said mounting plate for motion to and away from said whorl lower flange, and said moving means comprises a cam lever adapted to cause said sliding motion.

9. Braking mechanism according to claim 8 further comprising a spring linkage within said brake pad, said spring linkage comprising drive spring means connecting said cam lever to said brake pad, and return spring means connecting said mounting plate to said brake pad, said return spring means opposing said drive spring means and having a lower spring constant.

10. Braking mechanism according to claim 9 wherein said drive and return spring means are coil springs fitting within recesses provided in said brake pad.

11. Braking mechanism according to claim 9 wherein said cam lever is adapted to overtravel the position at which the brake pad first contacts said whorl flange, said drive spring means compressing to assimilate said overtravel, thereby to compensate for wear of said brake pad.

12. Braking mechanism according to claim 11 wherein said cam lever has a flat at its full braking position, said compressed drive spring means and said flat serving to hold said cam lever locked in that position.

13. Braking mechanism according to claim 9 wherein said return spring means exert a force transmitted to said cam lever in its fully retracted position, thereby to hold said cam lever restrained.

14. Braking mechanism according to claim 13 wherein said cam lever has a flat at its fully retracted position, said return spring means and said flat serving to hold said cam lever locked in that position.

15. Braking mechanism according to claim 9 wherein said return spring means comprises a pair of parallel return springs of similar spring constant, said drive spring means being located centrally between said return springs.

16. Braking mechanism for a spindle of the type having a base whose construction includes a mounting flange and a neck extending from the mounting flange to receive the spindle blade, and a whorl attached to the blade and having a lower flange adjacent the mounting flange, comprising:
mounting means forming a mounting platform adjacent said whorl;
a brake pad slidably connected to said mounting platform for motion to and away from said whorl lower flange;
a cam lever adapted to cause said sliding motion; and
a spring linkage within said brake pad, said spring linkage comprising drive spring means connecting said cam lever to said brake pad, and return spring means connecting said mounting plate to said brake pad, said return spring means opposing said drive spring means and having a lower spring constant.

17. Braking mechanism according to claim 16 wherein said drive and return spring means are coil springs fitting within recesses provided in said brake pad.

18. Braking mechanism according to claim 16 wherein said cam lever is adapted to overtravel the position at which the bake pad first contacts said whorl flange, said drive spring means compressing to assimilate said overtravel, thereby to compensate for wear of said brake pad.

19. Braking mechanism according to claim 18 wherein said cam lever has a flat at its full braking position, said compressed drive spring means and said flat serving to hold said cam lever locked in that position.

20. Braking mechanism according to claim 16 wherein said return spring means exert a force transmitted to said cam lever in its fully retracted position, thereby to hold said cam lever restrained.

21. Braking mechanism according to claim 20 wherein said cam lever has a flat at its fully retracted position, said return spring means and said flat serving to hold said cam lever locked in that position.

22. Braking mechanism according to claim 16 wherein said return spring means comprises a pair of parallel return springs of similar spring constant, said drive spring means being located centrally between said return springs.

References Cited

UNITED STATES PATENTS

| | | | |
|---|---|---|---|
| 2,770,092 | 11/1956 | Wood | 57—88 |
| 3,063,230 | 11/1962 | Tetreault | 57—88 |
| 3,116,591 | 1/1964 | Muller | 57—88 |
| 3,137,118 | 6/1964 | Keyser | 57—88 |
| 3,141,288 | 7/1964 | Carroll | 57—88 |

JOHN PETRAKES, Primary Examiner